(12) United States Patent
Dong et al.

(10) Patent No.: US 9,418,051 B2
(45) Date of Patent: Aug. 16, 2016

(54) METHODS AND DEVICES FOR EXTRACTING DOCUMENT STRUCTURE

(71) Applicants: PEKING UNIVERSITY FOUNDER GROUP CO., LTD., Beijing (CN); BEIJING FOUNDER APABI TECHNOLOGY LTD., Beijing (CN)

(72) Inventors: Ning Dong, Beijing (CN); Jianbo Xu, Beijing (CN); Wenjuan Huang, Beijing (CN)

(73) Assignees: Peking University Founder Group Co., Ltd., Beijing (CN); Beijing Founder Apabi Technology Ltd., Beijing (CN)

( * ) Notice: Subject to any disclaimer, the term of this patent is extended or adjusted under 35 U.S.C. 154(b) by 547 days.

(21) Appl. No.: 13/725,879

(22) Filed: Dec. 21, 2012

(65) Prior Publication Data
US 2013/0167018 A1  Jun. 27, 2013

(30) Foreign Application Priority Data
Dec. 21, 2011 (CN) .......................... 2011 1 0438858

(51) Int. Cl.
*G06F 17/00* (2006.01)
*G06F 17/21* (2006.01)
*G06F 17/27* (2006.01)

(52) U.S. Cl.
CPC .............. *G06F 17/211* (2013.01); *G06F 17/21* (2013.01); *G06F 17/2765* (2013.01)

(58) Field of Classification Search
CPC ................. G06F 17/21; G06F 17/27

USPC .......... 715/200, 243, 247, 251, 254
See application file for complete search history.

(56) References Cited

U.S. PATENT DOCUMENTS

| 7,979,786 | B1* | 7/2011 | Hull et al. ..................... 715/202 |
| 2003/0215137 | A1* | 11/2003 | Wnek ........................... 382/181 |
| 2006/0242180 | A1* | 10/2006 | Graf et al. .................... 707/101 |
| 2007/0027671 | A1* | 2/2007 | Kanawa ........................... 704/4 |
| 2007/0053611 | A1* | 3/2007 | Wnek ........................... 382/294 |
| 2007/0124319 | A1* | 5/2007 | Platt et al. .................... 707/101 |
| 2008/0144062 | A1* | 6/2008 | Nakatsuka ................... 358/1.11 |
| 2009/0252404 | A1* | 10/2009 | Lecerf .......................... 382/154 |
| 2010/0150448 | A1* | 6/2010 | Lecerf et al. ................. 382/190 |
| 2011/0099184 | A1* | 4/2011 | Symington ................... 707/755 |
| 2013/0205202 | A1* | 8/2013 | Xiao et al. .................... 715/249 |

FOREIGN PATENT DOCUMENTS

| CN | 101354727 A | 1/2009 |
| CN | 101937462 A | 1/2011 |

* cited by examiner

*Primary Examiner* — Stephen Hong
*Assistant Examiner* — Gregory J Vaughn
(74) *Attorney, Agent, or Firm* — Finnegan, Henderson, Farabow, Garret & Dunner, LLP

(57) ABSTRACT

A method for extracting a document structure is disclosed. The method may include determining a position of reference information in a layout file, and extracting items related to the reference information from the determined position of the layout file. An apparatus for extracting a document structure is also disclosed. The apparatus may include a processor configured to determine a position of reference information in a layout file; and to extract items related to the reference information from the determined position of the layout file. The apparatus may further include a storage device configured to store the extracted items.

14 Claims, 7 Drawing Sheets

Figure 3 process 200 process 300

Bibliographies

Antoinette K. Gordon, The Iconography of Tibetan Lamaism, 1959
L. Austine Waddell, Tibetan Buddhism: With Its Mystic Cults, Symbolism and Mythology, and in Its Relation to Indian Buddhism, 1972
Louis Frederic, Buddhism: Flammarion Iconographic Guides, 1995
Martin Brauen, The Mandala: Sacred Circle in Tibetan Buddhism, 1997
Marylin M.Rhie, Robert A.F. Thurman, The Sacred Art of Tibet: Wisdom and Compassion, 1991
Pratapaditya Pal, Art of Nepal: A Catalogue of The Los Angeles County Museum of Art Collection, 1985
Pratapaditya Pal, Art of The Himalayas: Treasures from Nepal and Tibet, 1991
Pratapaditya Pal, Art of Tibet: A Catalogue of The Los Angeles County Museum of Art Collection, 1990
Pratapaditya Pal, Tibetan Paintings: A Study of Tibetan Thankas Eleventh to Nineteenth Centuries, 1988
Rene De Nebesky-Wojkowitz, PH. D., Oracles and Demons of Tibet: The Cult and Iconography of The Tibetan Protective Deities, 1956
Sotheby's, Indian and Southeast Asian Art, New York Thursday March 20, 1997
Valrae Reynolds, Amy Heller, Janet Gyatso, The Newark Museum Tibetan Collection Volume III: Sculpture and Painting, 1986
Valrae Reynolds, Amy Heller, The Newark Museum Tibetan Collection Volume I: Introduction 1983

Figure 7

METHODS AND DEVICES FOR EXTRACTING DOCUMENT STRUCTURE

CROSS REFERENCE OF RELATED APPLICATIONS

This application claims the benefit of Chinese Patent Application No. 201110438858.2, filed on Dec. 21, 2011, which is incorporated by reference in its entirety.

TECHNICAL FIELD

The present invention relates to a field of digital typesetting of documents, more particularly to apparatus and methods for extracting a document structure.

BACKGROUND

References reflect the foundation of prior researches. Citation of references indicates that the current research is an extension from research results of predecessors, as well as gives credits to these predecessors for their researches. Therefore, in various documents, particularly papers, information of relevant references (hereinafter "reference information") is usually provided.

For example, FIG. 1 shows a layout of single-column reference information with a leading word. FIG. 2 shows a layout of reference information without leading word. FIG. 3 shows a layout of multiple-columned reference information with a leading word. As shown in FIGS. 1-3, the reference information is normally conformed to a particular format. Accordingly, when extracting contents from a layout file, the reference information may be extracted as structured data. For example, each of the first to fourth rows in FIG. 1 is one item, and the combination of the fifth to sixth rows is another item.

Currently, reference information is obtained from digital layout files mainly through extracting metadata using, for example, machine learning methods, or template methods, and then extracting reference items from the metadata. However, such an extraction method through metadata is usually inefficient. As a result, there exists a need for an improved apparatus and method for extracting a document structure.

SUMMARY

In one aspect, a method for extracting a document structure may include determining a position of reference information in a layout file, and extracting items related to the reference information from the determined position of the layout file.

In another aspect, an apparatus for extracting a document structure may include a processor configured to determine a position of reference information in a layout file; and to extract items related to the reference information from the determined position of the layout file. The apparatus may further include a storage device configured to store the extracted items.

The preceding summary and the following detailed description are exemplary only and do not limit the scope of the claims.

BRIEF DESCRIPTION OF THE DRAWINGS

Exemplary non-limiting embodiments of the invention are described below with reference to the attached figures. The drawings are illustrative and generally not to an exact scale. The same or similar elements on different figures are referenced using the same reference numbers.

FIG. 1 shows a layout of single-columned reference information with a leading word.

Figure 2:
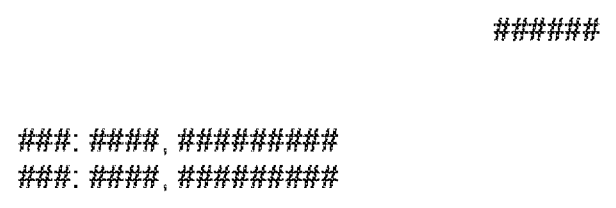

FIG. 2 shows a layout of reference information without a leading word.

Figure 3:
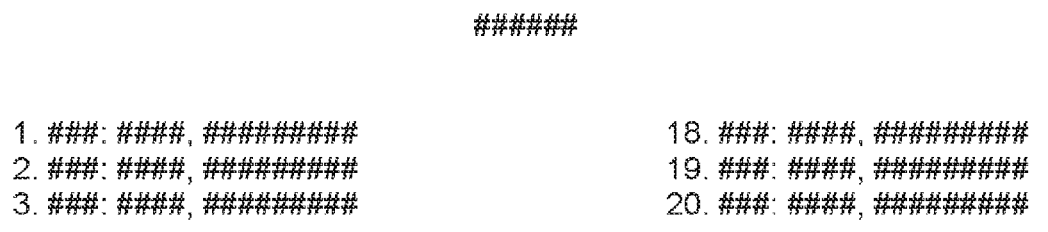

FIG. 3 shows a layout of multiple-columned reference information with a leading word.

FIG. 7 shows a layout of reference information, in which the keyword "bibliographies" is not center-texted.

DETAILED DESCRIPTION OF THE APPLICATION

Figure 4:
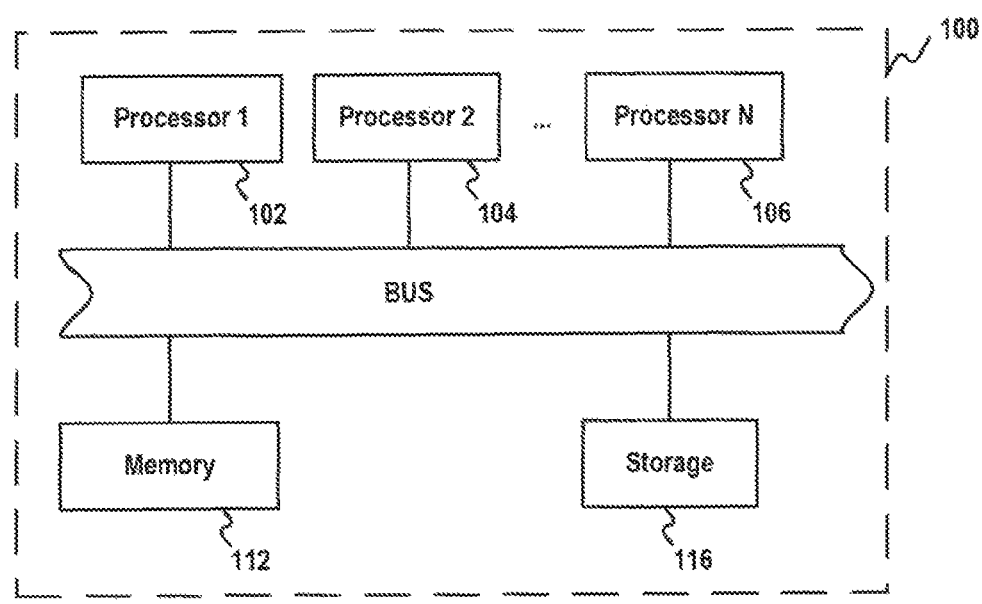
FIG. 4 is a schematic diagram illustrating a layout file processing apparatus, consistent with some disclosed embodiments.

Reference will now be made in detail to exemplary embodiments, examples of which are illustrated in the accompanying drawings. When appropriate, the same reference numbers are used throughout the drawings to refer to the same or like parts. FIG. 4 is a schematic diagram illustrating a layout file processing apparatus 100, consistent with some disclosed embodiments.

Apparatus 100 may include a general purpose computer, a computer cluster, a mainstream computer, a computing device dedicated for providing online contents, or a computer network comprising a group of computers operating in a centralized or distributed fashion. As shown in FIG. 4, system 100 may include one or more processors (processors 102, 104, 106 etc.), a memory 112, a storage device 116, and a bus to facilitate information exchange among various components of system 100. Processors 102-106 may include a central processing unit ("CPU"), a graphic processing unit ("GPU"), or other suitable information processing devices. Depending on the type of hardware being used, processors 102-106 can include one or more printed circuit boards, and/or one or more microprocessor chips. Processors 102-106 can execute sequences of computer program instructions to perform various methods that will be explained in greater detail below.

Memory 112 can include, among other things, a random access memory ("RAM") and a read-only memory ("ROM"). Computer program instructions can be stored, accessed, and read from memory 112 for execution by one or more of processors 102-106. For example, memory 112 may store one or more software applications. Further, memory 112 may store an entire software application or only a part of a software application that is executable by one or more of processors 102-106. It is noted that although only one block is shown in FIG. 4, memory 112 may include multiple physical devices installed on a central computing device or on different computing devices.

In some embodiments, storage device 116 may be provided to store a large amount of data, such as databases containing digital publications, layout files, contents files, etc. Storage device 116 may also store software applications that are executable by one or more processors 102-106. Storage device 116 may include one or more magnetic storage media such as hard drive disks; one or more optical storage media such as computer disks (CDs), CD-Rs, CD±RWs, DVDs, DVD±Rs, DVD±RWs, HD-DVDs, Blu-ray DVDs; one or more semiconductor storage media such as flash drives, SD cards, memory sticks; or any other suitable computer readable media.

Figure 5:
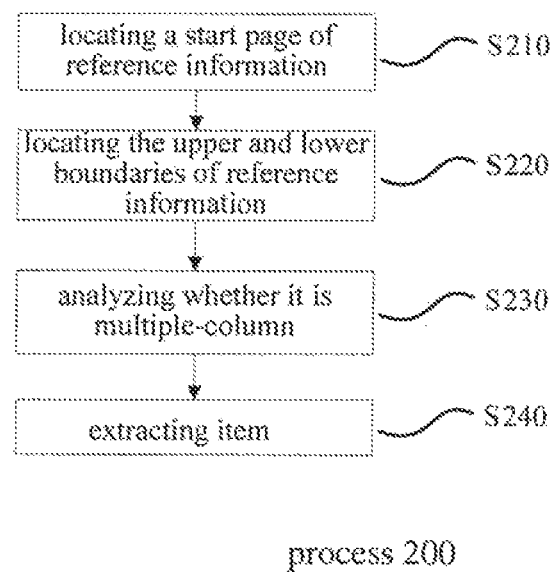
FIG. 5 shows a flow chart of a process for extracting a document structure, consistent with some disclosed embodiments.

Embodiments consistent with the present disclosure provide methods, systems, apparatuses, and computer readable media for extracting and processing contents from a layout file. For example, FIG. 5 shows a flow chart of a process 200 for extracting a document structure in accordance with an embodiment of the present invention. In some embodiments, process 200 may be implemented to directly extract reference information from layout contents without extracting metadata, and thus the efficiency of extracting reference information may be improved. In FIG. 5, process 200 comprises a series of steps that may be performed by one or more of processors 102-106 of system 100 to implement an extracting operation initiated by a user.

In general, when executing process 200, system 100 may first determine a position of reference information in a layout file, and then extract items related to the reference information from the determined position. Reference information usually has a specific layout structure and a specific typeset characteristic. Therefore, by determining the region of the reference information, references may be directly extracted from layout files without extracting metadata.

To determine the position of the reference information, system 100 may first identify the start page of the reference information (Step S210). In some embodiments, Step S210 may include searching for a directory item having a keyword related to the reference information in a directory of the layout file. Step S210 may further include determining a page number indicated by the directory item, and, based on the determined page number, identifying an electronic page as a start page of the reference information.

A layout file, such as a PDF file, usually contains a directory. A predefined keyword such as Chinese phrases "####", "□□□□", or English word "Reference" may be searched in the directory of the layout file. If one of these predefined keyword is found, the page number printed on the corresponding page will be recorded. An electronic file is different from a paper file. The directory of the electronic file is also counted towards the pages. Therefore, for example, if the directory takes three pages, the page that is indicated as the fifth page in directory is actually the eighth page in the electronic file.

In some embodiments, as part of Step S210, an offset between the page number of the electronic page in the directory and the page number printed on corresponding page may be calculated. Accordingly, the start page of the reference information may thus be located in the layout file. For example, the page may be located as the one at a page number equal to the page number of the electronic page plus the offset.

In some embodiments, the offset between the electronic page number and the actually printed page numbers may be calculated by matching a chapter title in the directory and the same chapter title in the document. Once the chapter title is matched, the offset may be determined as the difference between: 1) the electronic page number of the page where the matched chapter title is located; and 2) the page number of the matched chapter title in the directory. Using these embodiments, the accuracy for determining a start page may be improved.

In some embodiments, Step S210 may further include searching, in pages of the layout file, a keyword related to the reference information, and determining whether a page with the keyword is a start page of the reference information.

Although it is usually faster to search a keyword in a directory as the searching region is relatively small, certain layout files may not have directories. Accordingly, in some embodiments, the keyword search may be performed for all pages of the layout file. If a predefined keyword, such as Chinese phrases "####", "□□□□", or English word "Reference" is found during the layout analysis, the electronic page number of the page where the predefined keyword is located will be recorded.

In some embodiments, keyword search of the entire file may be performed in combination with a search in the directory, in order to locate the start page of reference information. For example, if the first search fails to locate the start page of reference information in a directory, a keyword search of the entire layout file may then be conducted. This may further improve the efficiency of search, while ensuring a thorough search of the reference information.

Once the start page is identified, system 100 may proceed to Step S220 to determine the upper and lower boundaries of the reference information. That is, system 100 may determine regions where the reference information is located in each page of the layout file, starting from the start page.

In some embodiments, Step S220 may further include various steps to determine a region of reference information in the layout file. For example, first, system 100 may search the keyword in text blocks (also referred to as original block, such as each character or symbol) in type area of the start page. Next, system 100 may determine whether the keyword is center-texted. If it is center-texted, system 100 may set the lower boundary of the keyword as the upper boundary of the region in the page. Otherwise, system 100 may set the upper boundary of the type area as an upper boundary of the region in the page.

Figure 1:
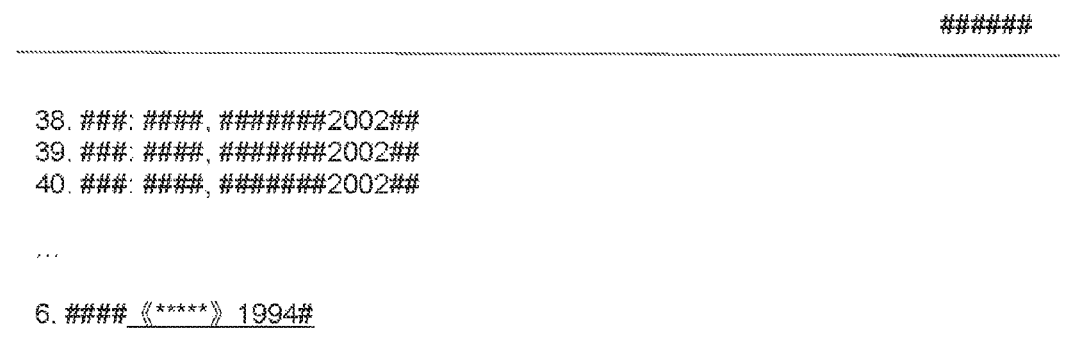

System 100 may then search downwards, from the upper boundary of the region in the page, for a row that includes publication year information. Such a row, if found, may be set as a PreBlock. For example, in FIG. 1, the first row contains publication year information, and thus, may be set as a PreBlock. In some embodiments, before the search, system 100 may extract each text block within the region, and combine the extracted text blocks into rows.

System 100 may then search downwards, from the PreBlock, rows including publication year information. If a row includes publication year information is found in the next Ath row, this row may be set as a NextBlock. (A may be an integer.) For example, the second row in FIG. 1 contains publication year information, and thus, may be set as the NextBlock. In some embodiments, the number of lines A may be set as 4.

In some embodiments, system 100 may determine whether the difference between the lower boundary of PreBlock and the upper boundary of NextBlock, is larger than C3 times of an average font size of text blocks in the PreBlock and NextBlock. If so, a lower boundary of the row next to PreBlock is set as present lower boundary of the reference information. Otherwise, a lower boundary of the row next to NextBlock will be set as present lower boundary of the reference information.

In some embodiments, system 100 may set the current NextBlock as the PreBlock. System 100 may then repeat the steps described in the immediately above two paragraphs leading with "System 100 may then search downwards . . . " and "In some embodiments, system 100 may determine . . . ," until no row including publication year information is found in the next Ath row from the PreBlock of the number of pages between the PreBlock and the last row of the page is less than A (A may be an integer.) For example, in FIG. 1, the second row, which is set as the NextBlock, may be set as the PreBlock. System 100 may search for publication year information starting from the second row. In addition, when setting the lower boundary searched at the last as the lower boundary of the region in the present page. For example, for FIG. 1, when the row with "<<*****>>" is set as the PreBlock, no more rows including publication year information will be found in the next search. In that case, the lower boundary of region of reference information is set as the lower boundary of the row next to this row.

System 100 may identify the present page as an end page of the region if no row including publication year information is found in the next Ath row. If the number of rows from PreBlock to the last row of the present page is less than A, the next page may be searched. If there are no more rows including publication year information, or a spacing between adjacent rows including such information is larger than C3 times of an average font size of a row, or the distance between a upper boundary of a first row including information on years and the upper boundary of the type area is larger than C3 times of an average font size of a row, system 100 may identify the previous page as the end page of the region. Otherwise, system 100 may set the upper boundary of the type area of the present page as the upper boundary of the region in the present page, and then repeat steps described in the immediately above four paragraphs leading with "System 100 may then search downwards . . . ", "System 100 may then search downwards . . . " and "In some embodiments, system 100 may determine . . . ," and "In some embodiments, system 100 may set the current NextBlock . . . . "

In Step S230, system 100 may analyze whether the region has multiple columns. System 100 may extract text blocks within the region, and determine the coordinates of these text blocks. In some embodiments, system 100 may record the top left apex of a page as the origin (0,0), then extend downwards and rightwards, and determine the coordinates of the text blocks of the page based on the minimal circumscription rectangle of the text blocks. For example, the coordinate of the top left corner of the rectangle may be recorded as $(x_1, y_2)$ and the coordinate of the bottom right corner may be recorded as $(x_2, y_2)$. That is, the left boundary or the region is recorded as $x_1$, the right boundary of the region is recorded as $x_2$, the upper boundary of the region is recorded as $y_1$, and the lower boundary of the region is recorded as $y_2$.

Based on the coordinates, system 100 may further determine the number of columns used to list the reference information. A multiple-column layout structure usually has a wide column pitch between two columns. Therefore, projection lines may be used to analyze a column pitch and determine how the layout was divided into multiple columns.

For example, system 100 may vertically project each of the text blocks below the lower border of the keyword, and determine the largest number of text blocks maxLine between respective adjacent projection lines. If maxLine>B, system 100 may set the largest spacing maxSpace between adjacent projection lines as $C_1$ times of the average font size of the text blocks. ($C_1$ may be a real number.) If C<maxLine≤B, system 100 may set maxSpace as the average font size of the text blocks. (C may be an integer.) If maxLine≤C, system 100 may set maxSpace as $C_2$ times of the average font size of the text blocks. ($C_2$ may be a real number.) In some embodiments, system 100 may also delete adjacent projection lines if the spacing between which is less than maxSpace minus 1.

If (number of remaining adjacent projection lines)/2≥2, system 100 may determine that the respective text blocks are arranged in multiple columns. Otherwise, system 100 may determine that the respective text blocks are arranged in a single column.

In an exemplary embodiment of the method disclosed above, $C_3$ may be set as 5, $C_1$ may be set as 0.6, $C_2$ may be set as 1.3, A may be set as 4, B may be set as 15, and C may be set as 8. However, it's contemplated that other values may be used for these parameters based on the specific applications.

Figure 6:
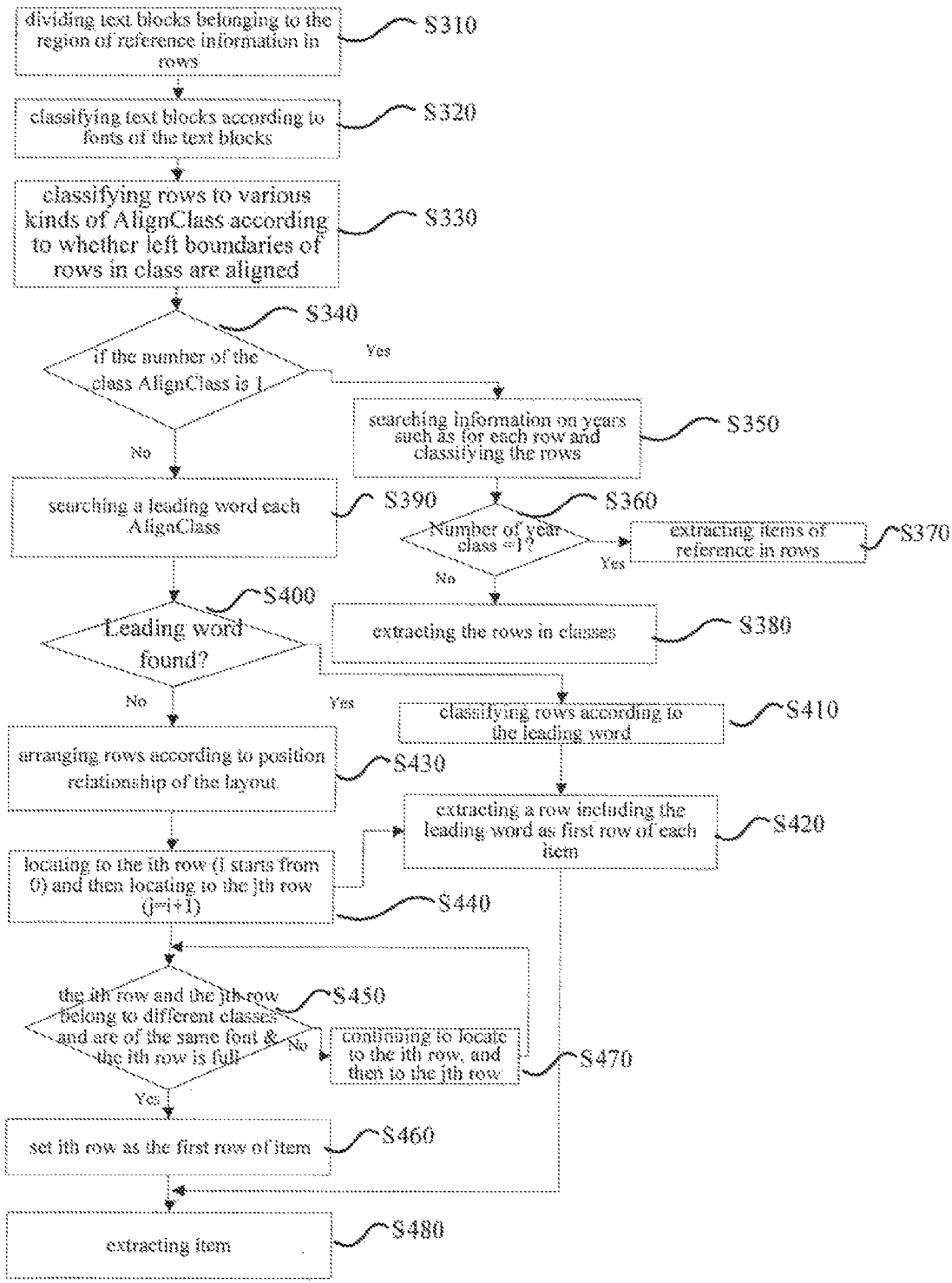
FIG. 6 shows a flow chart of a process for extracting a single-columned reference item, consistent with some disclosed embodiments.

In Step S240, system 100 may extract items related to the reference information within the region of the reference information. FIG. 6 shows a flow chart of a process 300 for extracting a single-columned reference item, consistent with some disclosed embodiments. In some embodiments, system 100 may divide the text block within the region of reference information into various rows (Step S310).

System 100 may further classify rows of each column in the determined regions, based on the fonts therein, into one or more font classes (Step S320). For example, system 100 may analyze the fonts used each row of text blocks, and set the font used by most words/characters as the font of the row and set the average font size of that font as the font size of the row. System 100 may then classify rows with the same type of font as one class (FontNameClass).

If the number of font classes FontNameClass is 1, system 100 may then locate the first row of item, as will be discussed below. If the number of font classes FontNameClass is larger than 1, system 100 may then count the number of rows for each class and locate the first row of the item starting from the class with most number of rows.

In Step S330, system 100 may classify rows in the current font class into one or more aligning classes according to aligning positions of left boundaries of rows. If there is only one aligning class (Step S340: Yes), system 100 may further classify the rows based on whether the respective rows contain publication year information (such as 19xx, 20xx, etc.) (Step S350). If there is only one year class (Step S360: Yes), each row may be extracted as an item (Step S370). If there are multiple year classes (Step S360: No), each row in the year class that contains public year information may be extracted as an item (Step S380).

If there are multiple aligning classes (Step S340: No), system 100 may sequentially search a predefined leading word in each aligning class (Step S390). Examples of leading words may include "1", "(1)", and "[1]" etc. If the leading word is found (Step S400: Yes), system 100 may classify the rows according to whether a leading word is included (Step S410) and extract the row that contains the leading word as the first row of the item (Step S420). Then system 100 may search for all extension rows associated with the first row in the aligning classes that use the same font as the first row and have left boundaries that are not aligned. System 100 may then combine the first row with the extension rows as one item.

If no leading word is found in the aligning classes (Step S400: No), the rows in each class may be arranged according to position relationship in the layout file (Step S430). For example, the rows may be arranged from smallest to largest according to the upper boundary of rows. In some embodiments, the text blocks may be arranged in the order of layout output and then inherent attributes of the text blocks, such as baseline and font may be analyzed. For example, system 100 may determine whether horizontal base lines of two fore-and-aft adjacent text blocks is less than 0.95 times of the height of the text block. If so, the text blocks are of the same row, otherwise, the text blocks are of different rows.

System 100 may then determine if the ith row (i starts from 0) and the jth row (j=i+1) are in the same aligning class (Step S430). If they are not in the same aligning class, but they have same fonts, and the ith row is a full low (Step S450: Yes), system 100 may set the ith row as the first row of an item (Step S460). Otherwise, set i=j and continue the above steps, until the first row of the item is identified (Step 470). After the first row is identified, system 100 may search for all extension rows associated with the first row in the aligning classes that use the same font as the first row and have left boundaries are not aligned. System 100 may then combine the first row with the extension rows as one item. The item may then be extracted in Step S480.

If the reference information is multi-columned, system 100 may first divide text blocks in the region of reference information into columns, and then combine text blocks in each column into rows. Process 300 may then be used to extract items from each column.

Consistent throughout this disclosure, a "full row" means that the difference between the right-hand boundary of rows and that of the type area is no more than the font size of one letter/character. Similarly, for multi-column reference, a "full row" means that the difference between the right-hand boundary of rows and that of the sub-column is no more than the font size of one letter/character.

In some embodiments, if the region of reference information encompass multiple pages, system 100 may determine the end page of the region as follows. First, system 100 may set the upper boundary of the region of reference information as the upper boundary of the type area. Then system 100 may determine the lower boundary based on the following conditions: 1) no row including publication year information is found on a page; 2) the spacing between two adjacent text blocks on the page including publication year information is greater than C3 times of the average font size of the row; and 3) the distance between the upper boundary of the first text block including publication year information and that of the type area is greater than C3 times of the average font size of the row. If a particular page satisfies these conditions, system 100 may identify the previous page of this page as the end page of reference.

In some embodiments, the reference information may be listed in multiple columns that encompass multiple pages. In that case, system 100 may extract items in the following order: first extract items from the first column of the start page, then extract items from the second column of the start page, then extract items from the first column of the next page, and then extract items from the second column of this page, until the end page of the region of reference information.

The embodiments of the present invention may be implemented using certain hardware, software, or a combination thereof. In addition, the embodiments of the present invention may be adopted to a computer program product embodied on one or more computer readable storage media (comprising but not limited to disk storage, CD-ROM, optical memory and the like) containing computer program codes.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for extracting a document structure, comprising:

determining a position of reference information in a layout file; and extracting items related to the reference information from the determined position of the layout file, which comprises:

determining, starting from a start page, a region of reference information in the layout file;

classifying rows of each column in the determined region into one or more font classes;

determining whether a keyword on the start page is center-texted;

if the keyword is center-texted, setting a lower boundary of the keyword as an upper boundary of the region of reference information;

if the keyword is not center-texted, setting a upper boundary of a type area on the start page as a upper boundary of the region of reference information;

searching downwards from the upper boundary for publication year information until no more row includes the publication year information;

setting the last row including the publication year information as the lower boundary of reference information;

determining whether the region of reference information contains multiple columns by:

vertically projecting each of the text blocks within the region, determining the largest number of text blocks (maxLine) between respective adjacent projection lines, determining the largest spacing between adjacent projection lines (maxSpace) based on the maxLine, removing adjacent projection lines if the spacing between which is less than the maxSpace minus 1, and determining that the region contains multiple columns if (number of remaining adjacent projection lines)/2≥2, and that the region contains a single column if otherwise; and extracting items from the font classes sequentially, starting from the font class having the largest number of rows.

2. The method according to claim 1, wherein determining the position of reference information in the layout file further comprises:

searching for a directory item in a directory of the layout file, the directory item containing a keyword related to the reference information;

determining a page number indicated by the directory item; and identifying an electronic page based on the determined page number as a start page of the reference information.

3. The method according to claim 2, wherein identifying the electronic page based on the determined page number as the start page of the reference information further comprises:

determining an offset between an electronic page number of the directory and a print page number of the directory; and identifying the electronic page based on the determined page number plus the offset.

4. The method according to claim 1, wherein determining the position of reference information in the layout file further comprises:
    searching for a keyword related to the reference information in the layout file; and
    determining whether a page with the keyword is a start page of the reference information.

5. The method according to claim 1, further comprising:
    if maxLine>B, setting the largest spacing maxSpace between adjacent projection lines as $C_1$ times of the average font size of the text blocks;
    if C<maxLine≤B, setting maxSpace as the average font size of the text blocks; and
    if maxLine≤C, setting maxSpace as $C_2$ times of the average font size of the text blocks,
    wherein $C_1$=0.6, $C_2$=1.3, B=15, and C=8.

6. The method according to claim 1, wherein extracting the items related to the reference information from the determined position of the layout file further comprises:
    classifying rows in a font class into one or more aligning classes, according to aligning positions of left boundaries of the rows;
    searching for a predefined leading word in each aligning class;
    setting a row with the leading word as a first row of an item;
    searching for extension rows associated with the first row in the aligning classes, wherein the extension rows are in a same font class as the first row and the left boundaries of the extension rows are not aligned with that of the first row; and
    combining the first row with the extension rows to form the item.

7. The method according to claim 6, further comprising:
    if a leading word is not found in the aligning classes, then:
    setting a row as the first row of the item if the row and its next row belong to different aligning classes and are of the same font, and the row is full;
    searching for extension rows associated with the first row in the aligning classes, wherein the extension rows are in a same font class as the first row and the left boundaries of the extension rows are not aligned with that of the first row; and
    combining the first row with the extension rows to form the item.

8. An apparatus for extracting a document structure, comprising:
    a processor configured to:
        determine a position of reference information in a layout file; and
        extract items related to the reference information from the determined position of the layout file; and
    a storage device configured to store the extracted items, wherein the processor is further configured to:
        determine, starting from a start page, a region of reference information in the layout file;
        classify rows of each column in the determined region into one or more font classes;
        determine whether a keyword on the start page is center-texted;
        if the keyword is center-texted, set a lower boundary of the keyword as a upper boundary of the region of reference information;
        if the keyword is not center-texted, set a upper boundary of a type area on the start page as a upper boundary of the region of reference information;
        search downwards from the upper boundary for publication year information until no more row includes the publication year information;
        set the last row including the publication year information as the lower boundary of reference information;
        determine whether the region of reference information contains multiple columns by:
            vertically projecting each of the text blocks within the region;
            determining the largest number of text blocks (maxLine) between respective adjacent projection lines;
            determining the largest spacing between adjacent projection lines (maxSpace) based on the maxLine;
            removing adjacent projection lines if the spacing between which is less than the maxSpace minus 1; and
            determining that the region contains multiple columns if (number of remaining adjacent projection lines)/2≥2; and
        extract items from the font classes sequentially, starting from the font class having the largest number of rows.

9. The apparatus according to claim 8, wherein the processor is further configured to:
    search for a directory item in a directory of the layout file, the directory item containing a keyword related to the reference information;
    determine a page number indicated by the directory item; and
    identify an electronic page based on the determined page number as a start page of the reference information.

10. The apparatus according to claim 9, wherein the processor is further configured to:
    determine an offset between an electronic page number of the directory and a print page number of the directory; and
    identify the electronic page based on the determined page number plus the offset.

11. The apparatus according to claim 8, wherein the processor is further configured to:
    search for a keyword related to the reference information in the layout file; and
    determine whether a page with the keyword is a start page of the reference information.

12. The apparatus according to claim 1, wherein the processor is further configured to:
    if maxLine>B, set the largest spacing maxSpace between adjacent projection lines as $C_1$ times of the average font size of the text blocks;
    if C<maxLine≤B, set maxSpace as the average font size of the text blocks; and
    if maxLine≤C, set maxSpace as $C_2$ times of the average font size of the text blocks,
    wherein $C_1$=0.6, $C_2$=1.3, B=15, and C=8.

13. The apparatus according to claim 8, wherein the processor is further configured to:
    classify rows in a font class into one or more aligning classes, according to aligning positions of left boundaries of the rows;
    search for a predefined leading word in each aligning class;
    set a row with the leading word as a first row of an item;
    search for extension rows associated with the first row in the aligning classes, wherein the extension rows are in a same font class as the first row and the left boundaries of the extension rows are not aligned with that of the first row; and
    combine the first row with the extension rows to form the item.

14. The apparatus according to claim 13, wherein if the leading word is not found in the aligning classes, the processor is further configured to:

- set a row as the first row of the item if the row and its next row belong to different aligning classes and are of the same font, and the row is full;
- search for extension rows associated with the first row in the aligning classes, wherein the extension rows are in a same font class as the first row and the left boundaries of the extension rows are not aligned with that of the first row; and
- combine the first row with the extension rows to form the item.

\* \* \* \* \*